May 31, 1932.  E. J. CHEESEWRIGHT  1,860,405
FLOWER HOLDER
Filed Dec. 22, 1927
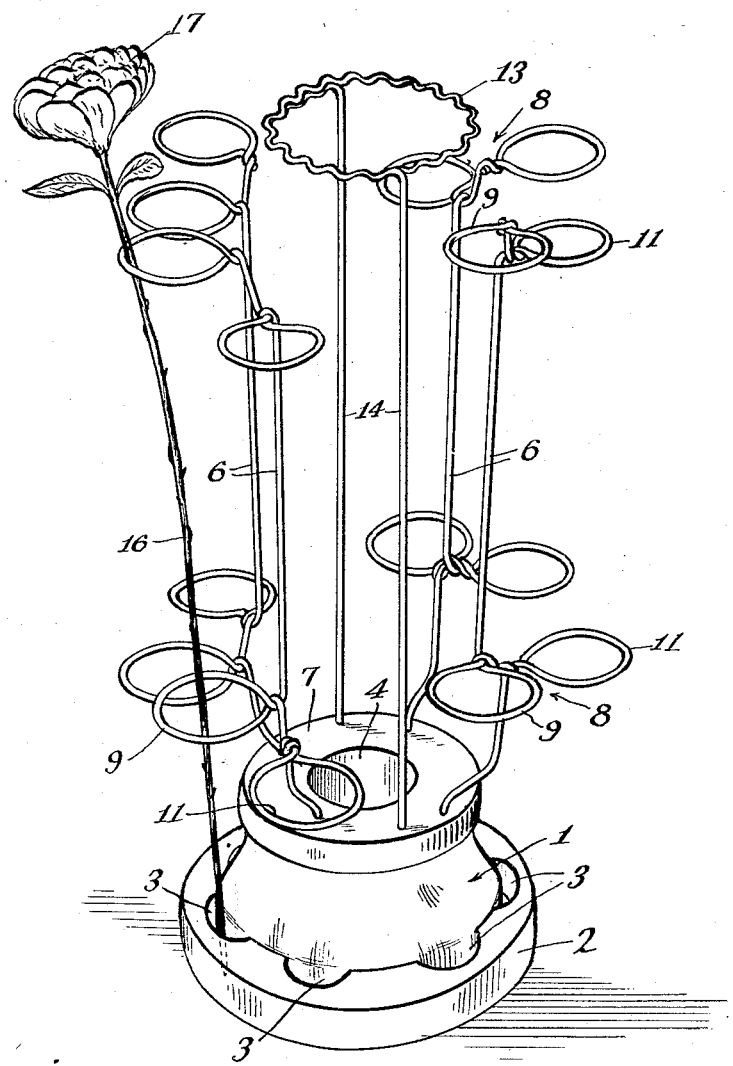
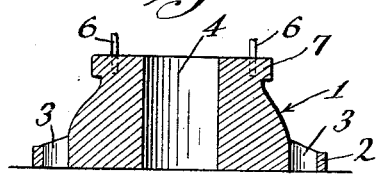
Inventor
Edgar J. Cheesewright
by Hazard and Miller
Attorneys.

Patented May 31, 1932

1,860,405

UNITED STATES PATENT OFFICE

EDGAR J. CHEESEWRIGHT, OF PASADENA, CALIFORNIA

FLOWER HOLDER

Application filed December 22, 1927. Serial No. 241,823.

This invention relates to flower holders.

An object of the invention is the provision of a flower holder capable of supporting flowers in an upright position in a flower bowl or other large mouthed container.

Another object is the provision of a flower holder capable of supporting a relatively long stemmed flower in such a manner that the stem is supported at various points throughout its length.

With the foregoing and other objects in view, which will be made manifest in the following detailed description and specifically pointed out in the appended claims, reference is had to the accompanying drawings for an illustrative embodiment of the invention, wherein:

Figure 1 is a perspective view of the flower holder of my invention, with a flower in position therein to show the manner of its use.

Fig. 2 is a vertical, medial, sectional view of the base of the flower holder of Figure 1.

The preferred embodiment of my invention herein shown and described, comprises a base 1 formed in any convenient manner such as by molding, and preferably of some relatively heavy material; but I prefer to use cast lead because of the resistance of this metal to the corrosive action of water. A flange 2 extends horizontally adjacent the bottom of the base preferably throughout its entire periphery; and a plurality of apertures 3, extend vertically through this flange. The base 1 is further provided with a relatively large central aperture 4, also extending vertically of the base 1. A plurality of supporting wires 6, extend vertically upwards from the top 7 of the base 1, and in each wire a plurality of flower supporting horizontal loops 8 are provided by twisting the wire upon itself. The loops 8 are preferably arranged in pairs, for example as shown upon Figure 1 there are two loops designated by the reference character 9. One loop constitutes an upper loop and the other loop a lower loop. These loops are arranged approximately in vertical alignment and are arranged over an aperture 3. On the opposite side of the supporting wire 6 there is a second pair of loops, designated by the reference character 11, one being an upper loop and the other a lower loop. These loops are also arranged in approximately vertical alignment over another aperture 3. When a flower has its stem inserted through the pair of loops 9 and there is a second flower with its stem inserted through loops 11, the stems being arranged on opposite sides of supporting wire 6 serve to a certain extent to partially conceal or hide the presence of the supporting wire 6.

As an additional flower supporting means there is a central loop 13 arranged over the central aperture 4. This loop is preferably sinuous or corrugated in form as shown, although this particular form is not essential. This central loop is supported by central supporting wires 14 which rise from the raised central portion 7 of the base to opposite sides of the loop.

One manner of using the flower holder of my invention is to place it with its base in a bowl of water, and to position flowers therein by placing the stem 16 of each of the flowers 17, through aligned pairs of loops, so that the stem 16 is given support at various points throughout its length. Other flowers may be positioned within the central loop 13, the serrations of which will aid in retaining the flowers in the selected arrangement. It is to be understood of course, that the support may be used for other objects than flowers, and that the nature of these other objects will not always require that the flower support be placed in water.

It will be understood that various changes in the details of construction may be made without departing from the spirit or scope of the invention as defined by the appended claims.

I claim:

1. A flower holder comprising a base having a central hole therethrough, a flange extending from the base and having a plurality of apertures therethrough, a plurality of supporting wires extending upwards from said base and having aligned upper and lower loops therein parallel to said base and arranged substantially over said apertures, a central loop disposed over the central hole, and wires extending upwardly from the base and supporting the central loop over the central hole.

2. A flower holder comprising a base having apertures therein, wires extending upwardly from adjacent the center of the base, loops extending laterally from both sides of the wires and arranged over the apertures, there being a central aperture in the base, a central loop arranged over the central aperture, and wires supporting the central loop over the central aperture.

3. A flower holder comprising a base having a raised central portion, there being a central aperture in the raised central portion, additional apertures in the base around the raised central portion, and wires extending upwardly from said raised central portion and carrying loops arranged over said additional apertures, said loops being arranged in pairs with each pair having one upper loop and one lower loop.

4. A flower holder comprising a base having a raised central portion, there being a central aperture in the raised central portion, additional apertures in the base around the raised central portion, and wires extending upwardly from said raised central portion and carrying loops arranged over said additional apertures, said loops being arranged in pairs with each pair having one upper loop and one lower loop, each wire carrying two pairs of loops.

5. A flower holder comprising a base having a raised central portion, there being a central aperture in the raised central portion, additional apertures in the base around the raised central portion, wires extending upwardly from said raised central portion and carrying loops arranged over said additional apertures, said loops being arranged in pairs with each pair having one upper loop and one lower loop, each wire carrying two pairs of loops, a central loop arranged over the central aperture, and wires extending upwardly from the raised central portion to opposite sides of the central loop for supporting it in position.

In testimony whereof I have signed my name to this specification.

EDGAR J. CHEESEWRIGHT.